United States Patent [19]

Scherbatskoy

[11] Patent Number: 5,390,153
[45] Date of Patent: * Feb. 14, 1995

[54] MEASURING WHILE DRILLING EMPLOYING CASCADED TRANSMISSION SYSTEMS

[76] Inventor: Serge A. Scherbatskoy, 3921 Clayton Rd. E., Fort Worth, Tex. 76116

[ * ] Notice: The portion of the term of this patent subsequent to Nov. 12, 2002 has been disclaimed.

[21] Appl. No.: 7,560

[22] Filed: Jan. 22, 1993

Related U.S. Application Data

[60] Continuation-in-part of Ser. No. 749,287, Aug. 23, 1991, Pat. No. 5,182,730, which is a continuation of Ser. No. 275,706, Nov. 22, 1988, Pat. No. 5,150,333, which is a continuation of Ser. No. 140,960, Jan. 5, 1988, abandoned, which is a continuation of Ser. No. 75,686, Jul. 20, 1987, abandoned, which is a continuation of Ser. No. 924,046, Oct. 28, 1986, abandoned, which is a continuation of Ser. No. 811,952, Dec. 20, 1985, abandoned, which is a continuation of Ser. No. 718,895, Apr. 2, 1985, abandoned, which is a continuation of Ser. No. 443,138, Nov. 19, 1982, abandoned, which is a division of Ser. No. 383,269, May 28, 1982, Pat. No. 4,520,468, which is a continuation of Ser. No. 68,526, Aug. 21, 1979, abandoned, which is a continuation-in-part of Ser. No. 857,677, Dec. 5, 1977, abandoned.

[51] Int. Cl.⁶ .............................................. G01V 1/40
[52] U.S. Cl. ........................................ 367/83; 175/40; 175/50
[58] Field of Search .............................. 367/43, 83–85; 364/422; 175/40, 50; 340/854.3; 166/250

[56] References Cited

U.S. PATENT DOCUMENTS

| | | | |
|---|---|---|---|
| 3,521,041 | 7/1970 | Van Blerkom et al. | 367/43 |
| 3,555,504 | 1/1971 | Fields | 367/83 |
| 3,742,443 | 6/1973 | Foster et al. | 367/83 |
| 4,215,425 | 7/1980 | Waggener | 367/83 |
| 4,553,226 | 11/1985 | Scherbatskoy | 367/83 |
| 5,160,925 | 11/1992 | Dailey et al. | 340/853.3 |
| 5,163,521 | 11/1992 | Pustanyk et al. | 367/83 |
| 5,182,730 | 1/1993 | Scherbatskoy | 367/83 |

OTHER PUBLICATIONS

Robinson et al., "Principles of Digital Filtering," Geophysics, vol. 24, #3, Jun. 1964, pp. 395–404.
Smith, "A Review of Filtering Seismic Data," Geophysics, vol. 23, #1, Jan. 1958, pp. 44–57.

*Primary Examiner*—Ian J. Lobo
*Attorney, Agent, or Firm*—Geoffrey A. Mantooth

[57] ABSTRACT

A measuring while drilling assembly utilizes two transmission channels connected in cascade in order to transmit a signal of a sensed downhole condition from a location near a downhole drill bit to a surface receiver. A first transmission channel has its downhole end connected to a first signal generator and its uphole end connected to a second signal generator. The second signal generator includes a pulser. A second transmission channel has its downhole end connected to the pulser and its uphole end connected to a pressure transducer at the surface of the earth.

1 Claim, 6 Drawing Sheets

FIG. 6A
DRILL PIPE MUD PRESSURE
PUMP NOT RUNNING

FIG. 6B
SPRINGS NOT SHOWN
PUMP STARTS

FIG. 6C
PUMP RUNNING

MEASURING WHILE DRILLING EMPLOYING CASCADED TRANSMISSION SYSTEMS

CROSS-REFERENCE TO RELATED APPLICATIONS

This application is a continuation-in-part of application Ser. No. 07/749,287, filed Aug. 23, 1991, now U.S. Pat. No. 5,182,730, which was a continuation of application Ser. No. 07/275,706, filed Nov. 22, 1988, now U.S. Pat. No. 5,150,333, which was a continuation of application Ser. No. 07/140,960, filed Jan. 5, 1988, now abandoned, which was a continuation of application Ser. No. 07/075,686, filed Jul. 20, 1987, now abandoned, which was a continuation of application Ser. No. 06/924,046, filed Oct. 28, 1986, now abandoned, which was a continuation of application Ser. No. 06/811,952, filed Dec. 20, 1985, now abandoned, which was a continuation of application Ser. No. 06/718,895, filed Apr. 2, 1985, now abandoned, which was a continuation of application Ser. No. 06/443,138, filed Nov. 19, 1982, now abandoned, which was a division of application Ser. No. 06/383,269, filed May 28, 1982, now U.S. Pat. No. 4,520,468, which was a continuation of application Ser. No. 06/068,526, filed Aug. 21, 1979, now abandoned, which was a continuation-in-part of application Ser. No. 05/857,677, filed Dec. 5, 1977, now abandoned.

FIELD OF THE INVENTION

This invention generally pertains to measurements while drilling a bore hole in the earth and more particularly pertains to systems, apparatus, and methods utilizing hydraulic shock waves in the drilling mud column for transmission of signals representing one or more downhole parameters to the earth's surface. It also pertains to systems and methods for detecting those signals in the presence of interfering noise.

DESCRIPTION OF THE PRIOR ART

This invention relates to data transmission systems for use in transmitting data from the bottom of a well bore to the surface while drilling the well.

It has been long recognized in the oil industry that the obtaining of data from downhole during the drilling of a well would provide valuable information which would be of interest to the drilling operator. Such information as the true weight on the bit, the inclination and bearing of the borehole, the tool face, fluid pressure, and temperature at the bottom of the hole and the radioactivity of substances surrounding or being encountered by the drill bit would all be expressed by quantities of interest to the drilling operator. A number of prior art proposals to measure these quantities while drilling and to transmit these quantities to the surface of the earth have been made. Various transmission schemes have been proposed in the prior art for so doing. For a description of prior art see for instance U.S. Pat. No. 2,787,795 issued to J. J. Arps, U.S. Pat. No. 2,887,298 issued to H. D. Hampton, U.S. Pat. No. 4,078,620 issued to J. H. Westlake et al, U.S. Pat. No. 4,001,773 issued to A. E. Lamel et al, U.S. Pat. No. 3,964,556 issued to Marvin Gearhart et al, U.S. Pat. No. 3,983,948 issued to J. D. Jeter, and U.S. Pat. No. 3,791,043 issued to M. K. Russell. All of the above listed patents are incorporated in this specification by reference.

Perhaps the most promising of these prior art proposals in a practical sense has been that of signalling by pressure pulses in the drilling fluid. Various methods have been suggested in the prior art to produce such mud pulsations either by a controlled restriction of the mud flow circuit by a flow restricting valve appropriately positioned in the main mud stream or by means of a bypass valve interposed between the inside of the drill string (high pressure side) and the annulus around the drill string (low pressure side).

It has been suggested in the prior art to produce mud pressure pulses by means of valves that would either restrict the mud flow inside the drill string or bypass some flow to the low pressure zone in the annulus around the drill string. Such valves are of necessity slow because when used inside the drill string the valve must control very large mud volumes, and when used to control a by-pass, because of the very high pressure differences, the valve was of necessity also a slow motorized valve. For example, such a motorized valve, interposed between the inside of the drill string and the annulus produced in response to a subsurface measurement slow descreases and slow increases of mud pressure. These were subsequently detected at the surface of the earth.

Figure 1A:
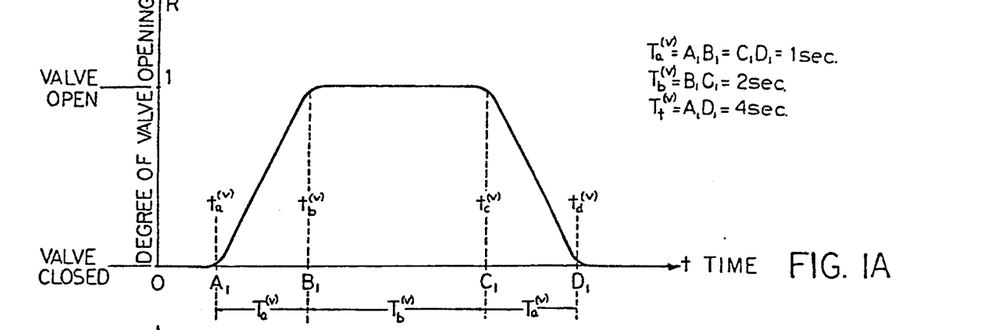
FIG. 1A shows schematically the operation of a slow acting valve as was suggested in the prior art.

In order to understand more fully the operation of a slowly acting motorized valve as suggested in the prior art, reference is made to FIG. 1A which shows the opening and the closing of such a valve as a function of time. Referring now specifically to FIG. 1A, the abscissas in FIG. 1A represents time, t, whereas the ordinates represent the degree of opening of the valve, R.

$$R = \frac{S(t)}{S_0} \qquad (1)$$

where $S_0$ is the total area of the opening and $S(t)$ is the area which is open at the instant t during the process of opening or closing of the valve. Thus when R=0 the valve was closed and when R=1 the valve was fully opened. The times involved in the operation of the valve were as follows:

$t_a^{(v)} = OA_1$ was the time at which the valve started to open;

$t_b^{(v)} = OB_1$ was the time at which the valve was fully open;

$t_c^{(v)} = OC_1$ was the time at which the valve started to close;

$t_d^{(v)} = OD_1$ was the time at which the valve was fully closed.

The time interval:

$$T_a^{(v)} = t_b^{(v)} - t_a^{(v)} = t_d^{(v)} - t_c^{(v)} \qquad (2)$$

$T_a^{(v)}$ will be referred to as the "time of opening or closing of the valve". The time interval $$T_b^{(v)} = t_c^{(v)} - t_b^{(v)} \qquad (3)$$

$T_b^{(v)}$ will be referred to as the "time of open flow". Thus, the total period of the actuation of the valve was $$T_t^{(v)} = 2T_a^{(v)} + T_b^{(v)} \qquad (4)$$

In the above attempts one had $T_a^{(v)} = 1$ second, $T_b^{(v)} = 2$ seconds and consequently the total time of the actuation of the valve was $T_t^{(v)} = 4$ seconds. These relatively slow openings and closings of the valve produced correspondingly slow decreases and increases of mud pressure at the surface of the earth (see FIG. 1B).

Figure 1B:
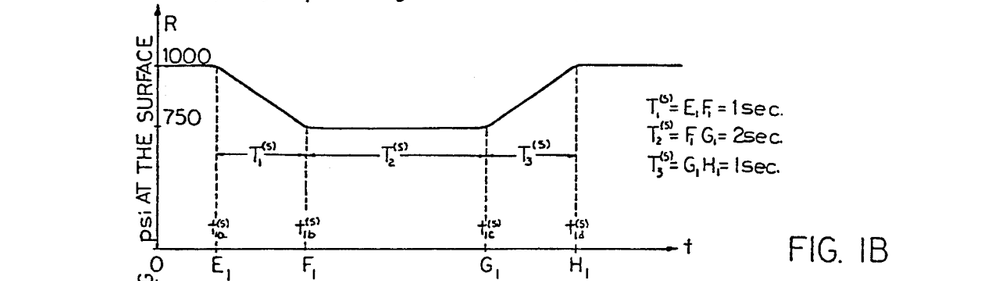
FIG. 1B shows schematically pressure variations detected at the earth's surface and resulting from the operation of the valve as shown in FIG. 1A. Both FIGS. 1A and 1B describe a condition referred to in this specification as a "regime of slow variations of pressure"

It can be seen that the mud pressure decreased from its normal value of for example, 1000 psi (when the valve was closed) to its lowest value of 750 psi (when the valve was open). The times involved in these observed pressure variations were as follows:

$t_{1a}^{(s)} = OE_1$ was the time at which the mud pressure starts to decrease from its normal level at 1000 psi;

$t_{1b}^{(s)} = OF_1$ was the time at which the mud pressure attained its lowest level at 750 psi and was maintained at this level until time $t_{1c}^{(s)} = OG_1$;

$t_{1c}^{(s)} = OG_1$ was the time at which the mud pressure starts to increase;

$t_{1d}^{(s)} = OH_1$ was the time at which the mud pressure attained its normal level at 1000 psi.

Thus, the pressure decreased during the time interval $T_1^{(s)} = t_{1b}^{(s)} - t_{1a}^{(s)}$, then it remained constant during the interval $T_2^{(s)} = t_{1c}^{(s)} - t_{1b}^{(s)}$, and then it rose from its depressed value to the normal level during the time interval $T_3^{(s)} = t_{1d}^{(s)} - t_{1c}^{(s)}$. Thus the total time of the mud flow through the bypass valve for a single actuation of the valve was $$T_t^{(s)} = T_1^{(s)} + T_2^{(s)} + T_3^{(s)} \quad (5)$$

I have designated quantities in FIG. 1A (such as $t_a^{(v)}$, $t_b^{(v)}$, $t_c^{(v)}$, $t_d^{(v)}$, $T_a^{(v)}$, $T_b^{(v)}$ and $T_t^{(v)}$ with superscript "v" to indicate that these quantities relate to the operation of the valve which is below the surface of the earth. On the other hand the quantities $t_{1a}^{(s)}$, $t_{1b}^{(s)}$, $t_{1c}^{(s)}$, $t_{1d}^{(s)}$, $T_1^{(s)}$, $T_2^{(s)}$, $T_3^{(s)}$ and $T_t^{(s)}$ in FIG. 1B are designated with superscript "s" to indicate that these quantities relate to measurements at the surface of the earth. This distinction between the quantities provided with superscript "v" and those with superscript "s" is essential in order to fully understand some of the novel features of my invention. It is essential in this connection to distinguish between the cause and the effect, or in other words, between the phenomena occurring downhole, in the proximity of the valve and those at the detector at the surface of the earth.

An essential feature of the previously proposed arrangement is based on the relationships:

$$T_1^{(s)} = T_a^{(v)} \quad (6)$$

$$T_2^{(s)} = T_b^{(v)} \quad (7)$$

$$T_3^{(s)} = T_a^{(v)} \quad (8)$$

These relationships show that the period of decrease or increase of the pressure at the earth's surface was the same as the corresponding period of opening and closing of the valve, and the period at which the pressure was substantially constant (at a decreased level) was the same as the period during which the valve was fully open. In other words, the decrease and subsequent increase of the mud pressure at the earth's surface was in exact correspondence with the opening and closing of the valve. This condition as expressed by the relationships (6), (7), and (8) will be referred to in this specification as relating to a "regime of slow variations of pressure".

The regime of slow pressure variation as suggested in the prior art was not suitable for telemetering in measurement while drilling operations, particularly when several down hole parameters are being measured. By the time a first parameter has been measured, encoded, transmitted to the surface and then decoded, the well bore can have been deepened and the second parameter may no longer be available for measurement. Relatively long time intervals were required for the conversion of the measured data into a form suitable for detection and recording. The entire logging process was lengthy and time consuming. Furthermore various interfering effects such as pulsations due to the mud pump and noise associated with various drilling operations produced additional difficulty. A slow acting motorized valve, such as that suggested in the prior art, is believed to be inadequate to satisfy current commercial requirements.

SUMMARY OF THE INVENTION

Some of the objectives of my invention are accomplished by using hydraulic shock waves for telemetering logging information while drilling is in process. These shock waves are produced by a very rapidly acting (for all practical purposes almost instantaneously acting) bypass valve interposed between the inside of the drill string and the annulus around the drill string. When the bypass valve suddenly opens, the pressure in the immediate vicinity of the valve drops and then returns to normal almost instantaneously and a sharp negative pulse is generated, and conversely, when the bypass valve suddenly closes, a sharp positive pulse is generated. Elasticity of mud column is employed to assist in the generation and transmission of such shock waves. The phenomenon is analogous to the well known water hammer effect previously encountered in hydraulic transmission systems. (See for instance John Parmakian on "Water Hammer Analysis", Prentice Hall, Inc., New York, N.Y. 1955 or V. L. Streeter and E. B. Wylie on "Hydraulic Transients" McGraw-Hill Book Co., New York, N.Y.)

Figure 2A:
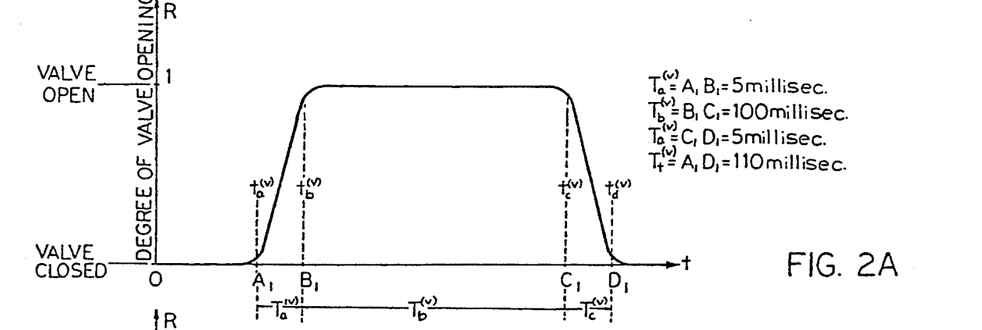
FIG. 2A shows schematically the operation of a fast acting valve in accordance with my invention.
Figure 2B:
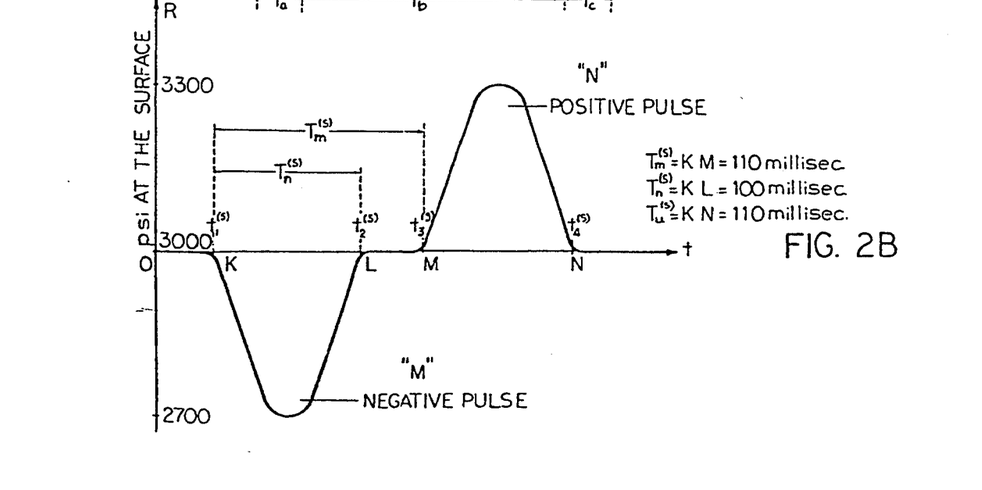
FIG. 2B shows schematically presssure variations detected at the earth's surface and resulting from the operation of the valve as shown in FIG. 2A. Both FIGS. 2A and 2B describe a condition referred to in this specification as a "regime of hydraulic shock waves".

Significant features of the valve such as the generation and detection of hydraulic shock waves are shown schematically in FIGS. 2A and 2B. The graph in FIG. 2A shows the openings and closings of a fast acting shock wave producing valve, whereas the graph of FIG. 2B shows pressure variations detected at the earth's surface and resulting from the operation of the valve as in FIG. 2A, Symbols such as $A_1$, $B_1$, $C_1$, $D_1$, $t_a^{(v)}$, $t_b^{(v)}$, $t_c^{(v)}$, $t_d^{(v)}$, $T_a^{(v)}$, $T_b^{(v)}$ and $T_t^{(v)}$ in FIG. 2A have a similar meaning as the corresponding symbols in FIG. 1A. However, the time scales in FIGS. 1A, 1B, 2A and 2B have been considerably distorted in order to facilitate description, and in the interest of clarity of explanation.

The first thing which should be noted in examining FIG. 2A is that the times of opening and closing of the valve are by several orders of magnitudes shorter than the corresponding times obtained by means of the motorized valve as reported in connection with FIG. 1A. In the arrangement previously suggested (as in FIG. 1A) one had $T_a^{(v)} = 1$ second whereas in accordance with the valve as in FIG. 2A one has $T_a^{(v)} = 5$ milliseconds. A similar situation applies to the time interval during which a valve remains open. In the arrangement previously suggested (as in FIG. 1A) one had $T_b^{(v)} = 2$ seconds whereas in FIG. 2A one has $T_b^{(v)} = 100$ milliseconds. Thus, for all practical purposes, the openings and closings of the valve in FIG. 2A may be considered as instantaneous or almost instantaneous.

Rapid or almost instantaneous openings and closings of the valve have an important and far reaching influence on the performance of a telemetering system in a measuring while drilling operation. The pressure variations detected at the earth's surface in accordance with my invention (FIG. 2B) show no similarity whatever to the pressure variations obtained by means of a slow acting valve (FIG. 1B). I have previously pointed out the existence of equations (6), (7), and (8) which show relationships between the events illustrated in FIG. 1A and those illustrated in FIG. 1B. Analagous relationships do not exist between the events in FIGS. 2A and 2B.

As shown in FIGS. 1A and 1B, the opening of the valve produced a corresponding decrease in the mud pressure at the surface of the earth, and conversely, the closing of the valve produced a corresponding increase in pressure.

For the sake of emphasis I wish to repeat that in the prior art the opening of the valve produced a single event namely a decrease in pressure and the subsequent closing of the valve produced another single event—an increase in pressure. On the other hand the fast opening of the valve as in FIG. 2A produces two events: a rapid decrease and subsequent increase in pressure (negative pulse "M" as in FIG. 2B). This is in contrast to the case shown in FIG. 1A and FIG. 1B where an opening and a subsequent closing of the valve is required in order to produce a decrease and a subsequent increase in pressure. Furthermore, the fast closing of the valve as in FIG. 2A produces an increase and a subsequent decrease of the mud pressure (positive pulse "N" as in FIG. 2B). Such an increase and subsequent decrease in pressure does not occur in the arrangements suggested in the prior art. There are two shock waves produced by a single operation of the valve. A wave form such as shown in FIG. 2B, which comprises both a negative and a positive pulse, will be referred to in this specification as a "valve wavelet". Pressure pulses associated with a valve wavelet have an onset rate of several thousand psi/sec. and are of short duration.

It is of interest to point out the rapidity of the phenomena associated with the observed valve wavelets. The times involved in FIG. 2B are as follows:

$t_1^{(s)} = OK$ is the time of appearance of the negative pulse "M";

$t_2^{(s)} = OL$ is the time at which the negative pulse "M" decayed;

$t_3^{(s)} = OM$ is the time of appearance of the positive pulse "N";

$t_4^{(s)} = ON$ is the time at which the positive pulse "N" decayed.

The time interval $T_n^{(s)}$ representing the "length" of the negative pulse "M" (or the positive pulse "N") is 100 milliseconds whereas the time interval $T_m^{(s)}$ from the appearance of the negative pulse "M" to the appearance of the positive pulse "N" is 110 milliseconds. Thus, the total period of flow as shown in FIG. 2B; i.e., $$T_u^{(s)} = T_n^{(s)} + T_m^{(s)} \qquad (9)$$

is 210 milliseconds whereas the total period of flow as shown in FIG. 1B (see equation 5) was $T_t^{(s)} = 4$ seconds.

The graphs in FIGS. 1A, 1B, 2A, and 2B have been simplified and idealized by eliminating ripples and other extraneous effects. It should also be noted (see FIG. 2B) that the bypass valve is at least partially open during the time interval from $t_1^{(s)}$ to $t_4^{(s)}$. During this time interval, there is a slow pressure decline which is eliminated at the detection point by an appropriate filter. Such a pressure decline is not shown in the graph of FIG. 2B.

It should also be pointed out that the numerical values attached to FIGS. 2A and 2B are given merely as an example. These values should not be interpreted as restricting my invention to any particular example given.

The process as explained in connection with FIGS. 2A and 2B will be referred to as relating to a "regime of hydraulic shock waves". Thus, a distinction is made between the regime of hydraulic shock waves as in FIGS. 2A and 2B and the regime of slow variations of pressure as in FIGS. 1A and 1B.

By providing a regime of hydraulic shock waves, I obtained a telemetering system by means of which large amounts of information can be transmitted per unit of time. Such a system is considerably better adapted to satisfy current commercial requirements than the one which is based on the regime of show variations of pressure.

The valve is operated by the output of one or more sensors for sensing one or more downhole parameters in the earth's subsurface near the drill bit. One single measurement of each parameter is represented, by a succession of valve wavelets. Each valve wavelet corresponds to a single opening and closing of the valve.

The present invention provides a logging while drilling assembly for use in a borehole. The assembly has a first signal generator means and a second signal generator means. The first signal generator means generates a signal representative of a sensed downhole condition and is mounted near a drill bit. The second signal generator means includes a pulser which in turn includes a valve. There are also first and second transmission systems. The first transmission system has its downhole end connected to the first signal generator means and its uphole end connected to the pulser. The second transmission system has its downhole end connected to the pulser and its uphole end connected to a pressure transducer at the surface.

BRIEF DESCRIPTION OF DRAWINGS

FIGS. 1A, 1B, 2A and 2B are graphs which relate in part to the portions of the specification entitled "Field of the Invention" and "Description of the Prior Art". The remaining figures, as well as FIGS. 1A, 1B, 2A, and 2B relate to the portions of the specification entitled "Summary of the Invention" and "Description of the Preferred Embodiments".

It should be noted that identical reference numerals have been applied to similar elements shown in some of the above figures. In such cases the description and functions of these elements will not be restated in so far as it is unneccessary to explain the operation of these embodiments.

DESCRIPTION OF THE PREFERRED EMBODIMENTS

I. General Description of Apparatus for Data Transmission while Drilling

Figure 3:
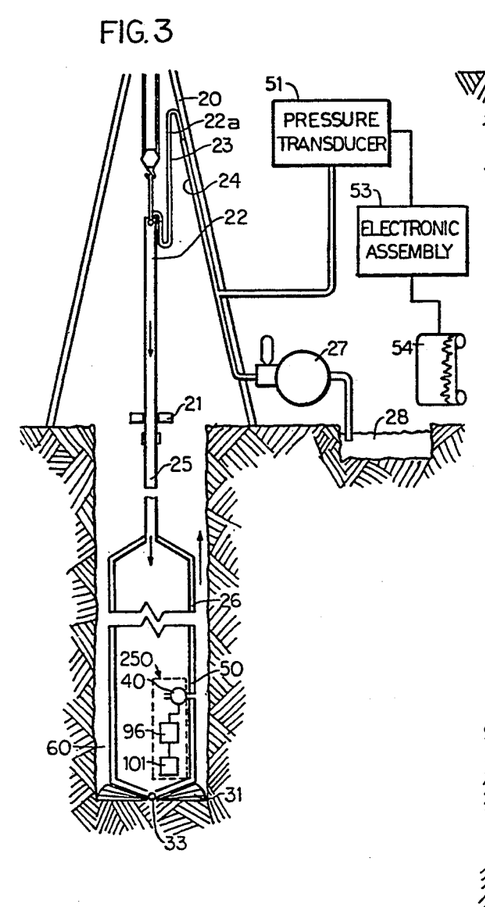
FIG. 3 schematically and generally illustrates a well drilling system equipped to simultaneously drill and to make measurements in accordance with some aspects my invention.

FIG. 3 illustrates a typical layout of a system embodying the principles of this invention. Numeral 20 indicates a standard oil well drilling derrick with a rotary table 21, a kelly 22, hose 23, and standpipe 24, drill pipe 25, and drill collar 26. A mud pump or pumps 27 and mud pit 28 are connected in a conventional manner and provide drilling mud under pressure to the standpipe. The high pressure mud is pumped down the drill string through the drill pipe 25 and the standard drill collars 26 and then through the special telemetry tool 50 and to the drill bit 31. The drill bit 31 is provided with the usual drilling jet devices shown diagrammatically by 33. The diameters of the collars 26 and the telemetry tool 50 have been shown large and out of proportion to those of the drill pipe 25 in order to more clearly illustrate the mechanisms. The drilling mud circulates downwardly through the drill string as shown by the arrows and then upwardly through the annulus between the drill pipe and the wall of the well bore. Upon reaching the surface, the mud is discharged back into the mud pit (by pipes not shown) where cuttings of rock and other well debris are allowed to settle and to be further filtered before the mud is again picked up and recirculated by the mud,pump.

Interposed between the bit 33 and the drill collar 26 is the special telemetering transmitter assembly or telemetry tool designated by numeral 50. This special telemetering transmitter assembly 50 includes a housing 250 which contains a valve assembly, or simply a valve 40, an electronic processing assembly 96, and sensors 101. The valve 40 is designed to momentarily by-pass some of the mud from the inside of the drill collar into the annulus 60. Normally (when the valve 40 is closed) the drilling mud must all be driven through the jets 33, and consequently considerable mud pressure (of the order of 2000 to 3000 psi) is present at the standpipe 24. When the valve 40 is opened at the command of a sensor 101 and electronic processing assembly 96, some mud is bypassed, the total resistance to flow is momentarily decreased, and a pressure change can be detected at the standpipe 24. The electronic processing assembly 96 generates a coded sequence of electric pulses representative of the parameter being measured by a selected sensor 101, and corresponding openings and closings of the valve 40 are produced with the consequent corresponding pressure pulses at the standpipe 24.

Numeral 51 designates a pressure transducer that generates electric voltage representative of the pressure changes in the standpipe 24. The signal representative of these pressure changes is processed by electronic assembly 53, which generates signals suitable for recording on recorder 54 or on any other display apparatus. The chart of recorder 54 is driven by a drive representative of the depth of the bit by means well known (not illustrated).

II. General Description of Special Telemetering Transmitter

Figure 4A:
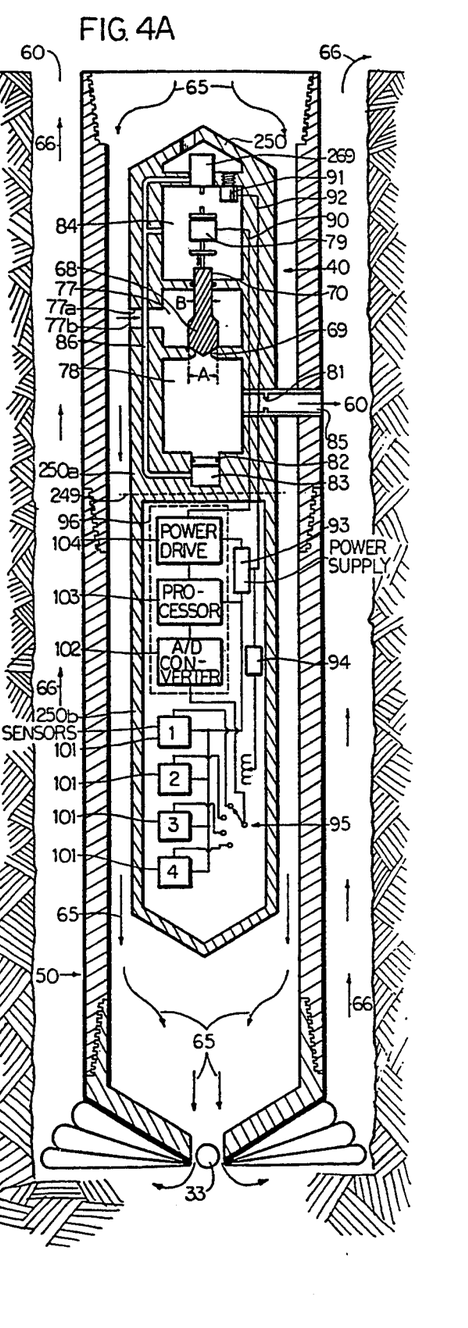
FIG. 4A shows schematically a portion of the subsurface equipment including a special telemetry tool in accordance with my invention.

FIG. 4A shows certain details of the special telemetering transmitter 50. Certain of these and other details have also been described in the above referred to copending application Ser. No. 857,677 filed by S. A. Scherbatskoy, of which this application is a continuation in part. FIG. 4A is diagrammatic in nature. In an actual tool, the housing 250, which contains the valve 40, the electronic processing assembly 96, and the sensors 101, is divided into two sections 250a and 250b. The upper portion 250a (above the dotted line 249) contains the valve assembly 40 and associated mechanisms and, as will be pointed out later in the specification, is of substantially larger diameter than 250b. The lower section 250b (below the dotted line 249) contains the electronic processing assembly 96, sensors 101, and associated mechanisms, and as will be explained later in the specification, has a substantially smaller diameter than the upper section 250a. As shown in FIG. 4A, the drilling mud circulates past the special telemetry tool 250a, 250b downwardly (as shown by the arrows 65) through the bit nozzle 33 and then back (as shown by the arrows 66) to the surface in annulus 60 and to the mud pit 28 by pipe means not shown. The valve assembly 40 comprises valve stem 68 and valve seat 69. The valve stem and seat are constructed in such manner that the cross sectional area of the closure A is slightly larger than the cross sectional area B of the compensating piston 70. Thus, when the pressure in chamber 77 is greater than that in the chamber 78, the valve stem 68 is forced downwardly; and the valve 40 tends to close itself more tightly as increased differential pressure is applied.

The fluid (mud) pressure in chamber 77 is at all times substantially equal to the fluid (mud) pressure inside the drill collar, designated as 26 in FIG. 3 and 50 in FIG. 4A, because of the opening 77a in the wall of the assembly 250. A fluid filter 77b is interposed, in passageway 77a in order to prevent solid particles and debris from entering chamber 77. When the valve 40 is closed, the fluid (mud) pressure in chamber 78 is equal to the fluid (mud) pressure in the annulus 60. When the valve 40 is open and the pumps are running mud flow occurs from chamber 77 to chamber 78 and through orifice 81 to the annulus 60 with corresponding pressure drops.

Double acting electromagnetic solenoid 79 is arranged to open or close valve 40 in response to electric current supplied by electric wire leads 90.

Let $P_{60}$ indicate the mud pressure in the annulus 60, $P_{77}$ the pressure in chamber 77, and $P_{78}$ the pressure in chamber 78. Then, when valve 40 is closed, one has $P_{78}=P_{60}$. When the pumps 27 are running and valve 40 is "closed", or nearly closed, and $P_{77}>P_{78}$ the valve stem 68 is urged towards the valve seat 69. When valve 40 is in the "open" condition (i.e., moved upwardly in the drawing) flow of mud from chamber 77 to the annulus 60 results; and because of the resistance to flow of the orifice C (FIG. 4B), one has the relationship $P_{77}P_{78}>P_{60}$. Chambers 83 and 94 are filled with a very low viscosity oil (such as DOW CORNING 200 FLUID, preferably of viscosity 5 centistokes or less) and interconnected by passageway 86. Floating piston 82 causes the pressure $P_{83}$ in the oil filled chamber 83 to be equal at all times to $P_{78}$. Thus, at all times $P_{78}=P_{83}=P_{84}$. Therefore, when the valve 40 is "open", since $P_{78}=P_{84}$ and $P_{77}>P_{84}$, the valve 40 is urged towards the "open" position by a force F=(area B) $(P_{77}-P_{84})$. The valve 40 can therefore be termed bi-stable; i.e., when "open" it tends to remain "open" and when "closed" it tends to remain "closed". Furthermore, when nearly open it tends to travel to the open condition and when nearly closed, it tends to travel to the closed condition. The valve 40 can therefore be "flipped" from one state to the other with relatively little energy. The valve action can be considered the mechanical equivalent of the electric bi-stable flip-flop well known in the electronics art.

Figure 4B:
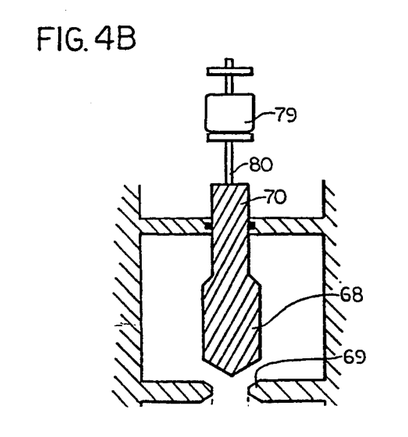
FIG. 4B shows schematically a portion of the arrangement of FIG. 4A.

FIG. 4B shows the valve 40 in the open condition; whereas, in FIG. 4A it is closed.

Referring again to FIG. 4A, numeral 91 indicates an electric "pressure switch" which is electrically conductive when $P_{77}>P_{78}$ (pump running) and electrically non-conductive when $P_{77}=P_{78}$ (pumps shut down—not running). Wire 92 running from pressure switch 91 to power supply 93 can, therefore, turn the power on or off. Also, by means of electronic counter 94 and electromagnetic sequence switch 95, any one of the four sensors 101 can be operatively connected to the electronic processing assembly 96 by sequentially stopping and running the mud pumps 27 or by stopping then running the pumps in accordance with a predetermined code that can be interpreted by circuitry in element 94.

III. Description of Electronic Processing Assembly Portion of Special Telemetry Tool We have described the operation of the bi-stable valve 40 and the sequence switch 95 which makes the selective electrical connection of the various sensors 101 to the electronic processing assembly 96.

Figure 5A:
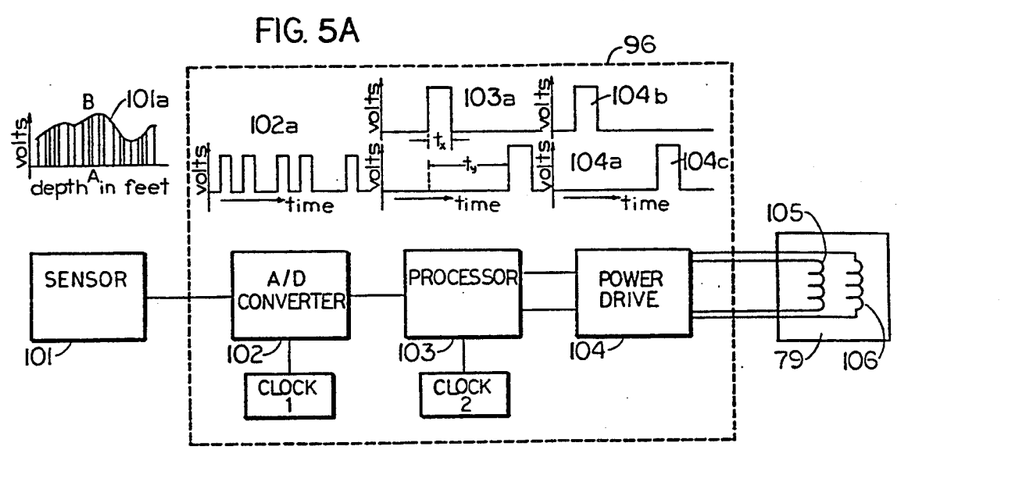
FIG. 5A shows, schematically and more in detail, the electronic processing assembly comprised within the dotted rectangle in FIG. 4A.

For further details of the electronic processing assembly 96 reference is made to FIG. 5A, where like numbers refer to like numbers of FIG. 4A.

Various types of sensors that generate electric signals indicative of a downhole parameter are well known. Examples are gamma ray sensors, temperature sensors, pressure sensors, gas content sensors, magnetic compasses, strain gauge inclinometers, magnetometers, gyro compasses, and many others. For the illustrative example of FIG. 5A, I have chosen a gamma ray sensor such as an ionization chamber or geiger counter or scintillation counter (with appropriate electronic circuitry). All these can be arranged to generate a DC voltage proportional to the gamma ray flux which is intercepted by the sensor.

It is understood that the switching from one, type sensor to another as accomplished by switch mechanism 95 of FIG. 4A is well within the state of the art, (electronic switching rather than the mechanical switch shown is preferable in most cases). Consequently, in FIG. 5A for reasons of clarity of description, only a single sensor 101 has been shown. Also, the power supply 93 and mud pressure actuated switch 91 of FIG. 4A are not illustrated in FIG. 5A.

In FIG. 5A, the sensor 101 is connected in cascade to A/D convertor 102, processor 103, and power drive 104. The power drive 104 is connected to windings 105 and 106 of the double acting solenoid designated as solenoid 79 in FIG. 4A. The power drive 104 may be similar to that shown by FIG. 3E of the parent application. The operation is as follows: the sensor 101 generates an output electric analog signal as represented by the curve 101a shown on the graph immediately above the sensor rectangle 101. The curve shows the sensor output as a function of the depth of the telemetering transmitter 50 in the borehole. The A/D converter converts the analog signal of 101 into digital form by measuring in succession the magnitude of a large number of ordinates of curve 101a and translating each individual ordinate into a binary number represented by a binary word. This process is well known in the art and requires no explanation here. It is important, however, to realize that whereas graph 101a may represent the variation of the signal from the transducer in a matter of hours, the graph 102a represents one single ordinate (for example, AB of the curve 101b). Thus, the time scale of the axis of absissas on FIG. 102a would be in seconds of time and the whole graph 102a represents one binary 12 bit word, and in actuality represents the decimal number 2649. Thus, each 12 bit word on graph 102a represents a single ordinate such as the ordinate AB on the graph 101a. The usual binary coding involves time pauses between each binary word. After the pause a start up or precursor pulse is transmitted to indicate the beginning of the time interval assigned to the binary word. This precursor pulse is not part of the binary word but serves to indicate that a binary word is about to commense. The binary word is then transmitted which is an indication of the value of an ordinate on graph 101a; then a pause (in time) followed by the next binary word representing the magnitude of the next ordinate, and so on, in quick succession. The continuous curve of graph 101a is thus represented by a series of binary numbers or words each representing a single point on the graph 101a. It is important to understand here that between each binary word there is always a pause in time. This pause (during which no signals are transmitted) is frequently several binary words long, and the pause will be employed for an important purpose which will be explained later in the specification. In order to permit decoding at the surface, the clock No. 1 must be rigorously constant (and in synchronism with the corresponding clock 212 or 309 located at the surface)., and it generates a series of equally timed spaced pulses in a manner well known in the art of electronics.

The graph 103a represents a single bit of the binary word 102a, and the axis of abcissas here again is quite different from the previous graphs. The time on graph 103a is expressed in milliseconds since graph represents only a single bit. Each single bit is translated into two electric pulses each of time duration $t_x$ and separated by a time interval $t_y$. Graph 104a is a replica of 103a, which has been very much amplified by the power drive 104. Electric impulse 104b is applied to solenoid winding 105 (which is the valve "open" winding), and electric impulse 104c is applied to solenoid winding 106 (which is the valve "close" winding). The valve 40 of FIG. 4A is thus opened by pulse 104b and closed by pulse 104c and, therefore, the valve 40 remains in the open condition for approximately the time $t_y$. The times $t_x$ are adjusted to be proper for correct actuation of the solenoid windings and the time $t_y$ is proportioned to open the valve 40 for the correct length of time. Both of these times are determined and controlled by the clock #2.

In telemetering information from a sensor to the earth's surface, I provide appropriate pauses between transmission of successive binary words. Because of these pauses, it is possible to store in an appropriate electronic memory at the surface equipment the noise caused by the drilling operation alone (without the wavelet). The necessary arrangements and procedures for doing this will be described later in this specification.

IV. Description of Power Supply for Special Telemetering Transmitter

As was pointed out previously, the valve 40 of FIG. 4A must be very fast acting, and to drive it fast requires considerable power. (It has been determined as a result of appropriate testing that such a valve requires about ½ to ¾ horsepower to operate at the necessary speed).

Although this power is very substantial, it is applied only very briefly, and consequently requires only small energy per operation.

In actual operation during tests, it was found that ½ horsepower applied for about 40 milliseconds provided the required energy to produce a satisfactory single valve actuation. This energy can be calculated to be about 15 Joules. A battery pack that is sufficiently small to be contained within housing 250b of FIG. 7A can provide approximately 4 million Joules, without requiring recharge or replacement. The system is therefore capable of generating 130,000 complete valve operations (open plus close). In actuality the energy consumption is less than 15 Joules per operation. The inductance, the Q, and the motional impedance of the solenoid winding cause the current build up to be relatively slow and along a curved rise as shown in curve 272A of FIG. 5C and 300, 301, of FIG. 6E. Thus the total energy per pulse is substantially less than 15 Joules and has been measured at 9 Joules thus providing a capability of 216,000 complete valve actuations. (A still greater capability is achieved by use of the circuitry described later in connection with FIG. 5C.) From the above, it can be seen that providing the necessary downhole energy from batteries for a practical telemetry tool is quite feasible. Providing the necessary very large power (½ horsepower), however, presents difficult problems.

It was clear that the solution to such a problem would involve the storage of energy in a mechanism that could be caused to release it suddenly (in a short time) and thus provide the necessary short bursts of high power. One such mechanism was "hammer action" which was utilized in the tool disclosed in my co-pending application, but which has been found to be sometimes insufficient. Other mechanisms considered early were the use of compressed air, compressed springs and others. Capacitor energy storage systems required large values of capacitance: The energy stored in a capacitor varies as the first power of the capacitance and as the square of the stored voltage, and since low inductance, fast acting, solenoid drive windings are required, the necessity of low voltage devices becomes apparent, initial calculation indicated that unduly large capacitors would be required.

After further evaluation, it appeared that an operable system might be feasible. By mathematical analysis and by experiments and tests it was determined that a set of optimum circuit parameters would be as follows:

1. Inductance of solenoid winding: 0.1 henrys when in the actuated position and 0.07 henrys when in the non-actuated position (i.e., a tapered armature solenoid).
2. Resistance of solenoid winding: 4.5 ohms.
3. Voltage at which energy is stored: 50 volts.
4. Magnitude of storage capacitor: 10,000 mfd.
5. Current capability of drive circuit: 10 amperes.

It was determined that in order to have fast solenoid action, low inductance windings are desirable. It was also determined that current capabilities of electronic drive circuits can be increased well beyond 10 amperes. Low voltage, however, requires unduly large values of capacitance.

Recent advances in so called molten salt batteries have produced energy sources of very good compactness. The same recent technology has also developed capacitors of extraordinarily high values, 10 farads in as little space as 1 cubic inch. These were unacceptable because the required heating to a high temperature (500° C.) which was deemed impractical; and the cost was prohibitive. Consequently, still further efforts were required. Following a thorough and lengthy investigation, finally it was discovered that a tantalum slug capacitor made in accordance with the latest developments would meet the specifications if the other parameters and factors outlined above were optimized to match the characteristics of such capacitors.

From the above it can be seen that at least 216,000 complete valve operations can be realized from one battery charge. Assuming that the telemetry system can provide adequate continuous data by transmitting five pulses per minute, the system is capable of operating continuously in a bore hole for a period of 440 hours. It must be pointed out however that continuous operation is often not necessary. The tool can be used only intermittently on command by the circuitry controlled by switch 91 and elements 94 and 95 of FIG. 4A.

Furthermore, as will be explained later, when advantage is taken of the improved circuitry of FIG. 5C an even greater number of valve operations can be achieved. Operation at a rate of one pulse per second is considered practical.

There is another parameter to be determined: the proper recharging of the capacitor after discharge. The capacitor can be charged through a resistor connected to the battery, (or other energy source) but this sometimes proved to be slow because as the capacitor became partially charged, the current through the resistor diminished, and at the end of the charge cycle, the charging current approached zero. If the ohmic valve of the resistor is made small, the batteries would be required to carry excessive momentary current because the initial current surge during the charging cycle would exceed the value for maximum battery life. The best method is to charge the capacitor through a constant current device. The capacitor would then be charged at an optimum charging current corresponding to the optimum discharge current for the particular type of battery for maximum energy storage. By correctly determining the charging current, a substantial increase (sometimes a factor of 2 or 3) in the amount of energy that is available from a given battery type can be achieved. Constant current devices are well known and readily available electronic integrated circuits, and are available for a wide range of current values.

Figures 5B, 6D, 7A, 7B, 7C:
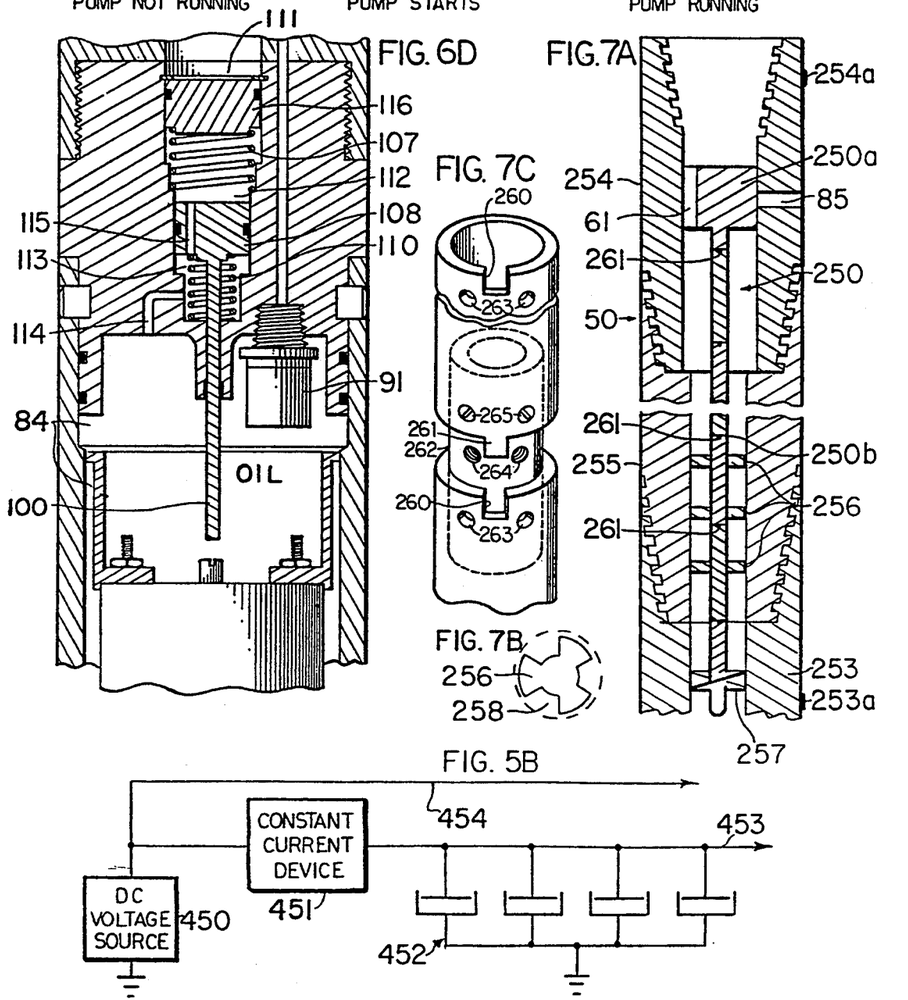
FIG. 5B shows schematically a power supply including a capacitor charging and discharging arrangement for providing the required power and energy for actuating the valve of the special telemetry tool.
FIG. 6D is an engineering drawing of the arrangement shown in FIGS. 6A, 6B, and 6C.
FIG. 7A shows schematically the "sub" and housing structure for the special telemetry tool.
FIG. 7B shows schematically the cross-section shape of centralizers that may be utilized with the structure of FIG. 7A.
FIG. 7C shows schematically special connector means that may be utilized for joining the sub-sections of housing portion 250b of FIG. 7A.

FIG. 5B shows schematically a power supply which may be incorporated in the power drive 104 of FIG. 4A including a capacitor charging and discharging arrangement for providing the required power and energy for the windings of solenoid 79. In FIG. 5B, 450 indicates a battery or turbo generator or other source of direct current electric potential, 451 the constant current device, and 452 the capacitor. The capacitor is charged through the constant current device 451 and discharged via lead 453. The lead 454 provides the regular steady power required for the balance of the downhole electronics.

V. Description of Hydraulic "Auto-Close" Signalling Valve

I have also provided an arrangement which will operate in case of a malfunction which could occur when the valve is "stuck" in an open position for a long period of time. An arrangement for automatically closing the valve in case of such malfunction (indicated by reference numeral 269 in FIG. 4A) is illustrated diagrammatically in connection with FIGS. 6A, 6B, and 6C.

As was pointed out earlier in the specification, the valve is designed to have a hydraulic detent or bi-stable action; i.e., when opened by an impulse from the solenoid winding 105 it tends to remain open and later, when closed by an impulse from the solenoid winding 106, it tends to remain closed. It is possible that because of an electrical or mechanical malfunction the valve could become "stuck" in the open position. It should be noted that if such a malfunction occurs the drilling operation can proceed. Some wear would occur at the orifice 81 of FIG. 4A. However, the disturbance to the mud system hydraulics by having the valve open for long periods of time is not desirable; and even though drilling can continue, it is very advantageous to have the valve closed most of the time and opened only to produce the short pulses required to generate the hydraulic shock wave.

Figure 6A:
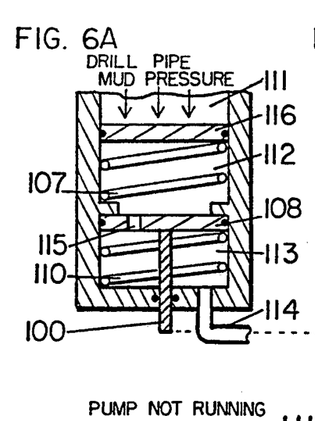
FIGS. 6A, 6B and 6C show diagrammatically the operation of hydraulic "auto close" of the signalling valve.
Figures 6B, 6C:
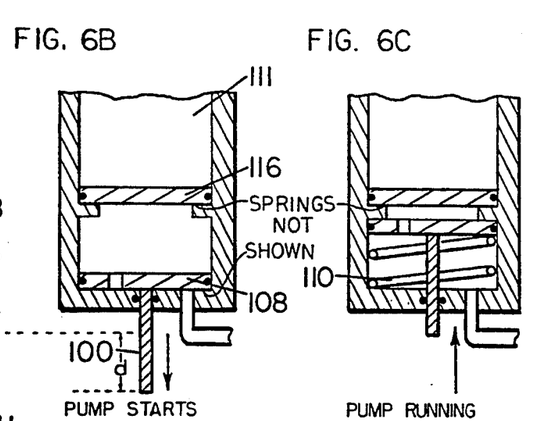

In the diagrammatic drawings of FIGS. 6A, 6B, and 6C, the rod 100 is used to push the valve closed by exerting a force downward on the rod 80 of FIG. 4B (the solenoid armature shaft).

Referring now to FIGS. 6A, 6B, 6C, and 6D, the upper end of the mechanism is exposed to "drill pipe mud"; i.e., mud under the hydrostatic pressure plus the differential pressure across the bit; i.e., the difference in pressure between the inside of the tool 50 and the annulus 60. When the pumps are not running, the pressure at the zone 111 is hydrostatic only; and when the pumps are running, the pressure is hydrostatic plus differential. Since the differential pressure is of the order of 1000 to 2000 psi, a large pressure change occurs at the zone 111 when the pumps are started up (i.e., an increase of 1000 to 2000 psi). In FIG. 6A, when the pumps are not running, zones 112, 113 are at annulus pressure because tube 114 is connected to the chamber 84 which contains oil at annulus pressure (see FIG. 4A) and because the orifice 115 interconnects the zones 112 and 113.

Assume now that the pumps are started up. The pressure in zone 111 then increases substantially (i.e., by 1000 to 2000 psi) the piston 116 is pushed downward compressing the spring 107 (not illustrated in FIG. 6B) and the high pressure oil in zone 112 pushes the piston 108 downward and compresses the spring 110 (not illustrated). Thus, when the pumps are started up, the parts of FIG. 6A change to the configuration of FIG. 6B, and both the pistons 116 and 108 are in the downward position and the rod 100 is extended downwardly as shown.

Now because of the orifice 115 and the action of spring 110, the piston 68 is pushed upwardly with a velocity determined by the size of the orifice 115, the spring constant of spring 110, and the viscosity of the oil in the zones 112, 113. This velocity can be easily controlled and made equal to any desired value; as for example, a velocity such that the piston 108 will return to its original upward location in about 1 minute. Therefore, after one minute the arrangement assumes the configuration of FIG. 6C. For the same reasons, when the pump is stopped the action of the spring 107 and the orifice 115 will cause the piston 116 to rise back to the original condition of FIG. 6A.

It can be seen, therefore, that every time the mud pump is started the rod 100 will move downwards by the distance d as shown in FIG. 6B and then return to the normal retracted position. Since in normal drilling the pump is stopped every time a joint of drill pipe is added, it follows that every time a joint of drill pipe (usually 30 feet long) is added, the rod 100 will make a single downward excursion and then return to its original upward position.

As was pointed out previously, the rod 100 is arranged so that when it is extended downwardly it pushes solenoid armature shaft 80 of FIG. 4A downwardly and closes the valve. Thus, the device of FIG. 6A, 6B, 6C, and 6D is a "safety" device; i.e., should the valve get stuck in the open position because of an electrical or mechanical malfunction, the valve will be forced shut after a maximum of 30 feet of drilling.

FIG. 6D shows the engineering drawing of the device diagrammatically illustrated in FIGS. 6A, 6B, and 6C. In the actual instrument, the device as illustrated in FIG. 6D is placed in the location 269 of FIG. 4A. Like numbers on FIG. 6D represent the elements having like numbers on FIGS. 6A, 6B, 6C, and FIG. 4A.

VI. Description of Electronic "Fail Safe" for Signalling Valve

The hydraulic "auto close" system described in connection with FIGS. 6A, 6B, 6C, and FIG. 6D will automatically close the valve every time the mud pumps are stopped and restarted, and thus any mechanical sticking of the valve can be remedied. There is a case, however, that requires further attention: If the "close" electric circuitry 103, 109 of FIG. 5A were to fail for any reason (e.g. a burned out solenoid winding) then the valve would reopen electrically, shortly after the hydraulic "auto close" device closed it.

Figure 6E:
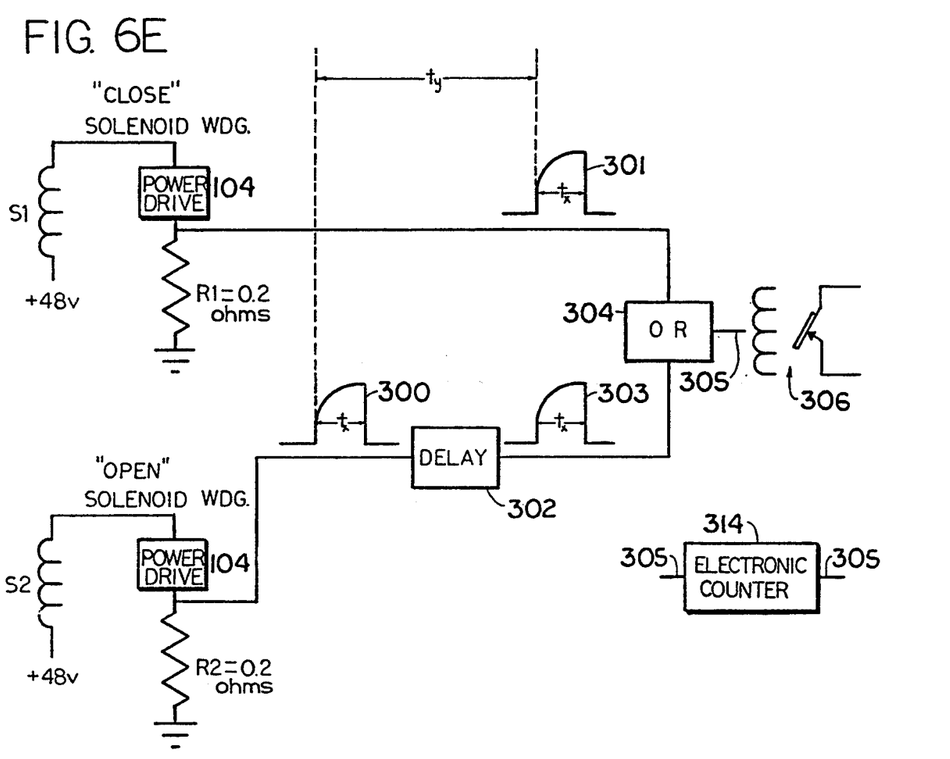
FIG. 6E shows schematically an electronic "fail safe" arrangement applicable to the signalling valve.

FIG. 6E shows an electric system that will inhibit operation of the valve in case of an electrical failure in the downhole apparatus. $S_1$ designates the winding of the solenoid that "closes" the valve and $S_2$ the winding of the solenoid that opens the valve. The resistor $R_1$ is connected in series with the portion of the solenoid drive 104 which actuates the "close" solenoid winding $S_1$. The resistor $R_2$ is connected in series with the portion of the solenoid drive 104 which actuates the "open" solenoid winding $S_2$. These resistors are of very low ohmic value (about 0.05 to 0.2 ohms). It is understood that the operation of the system described in detail with respect to FIG. 5A in this specification is as follows: The "open" electric current pulse is generated first and is shown diagrammatically in FIG. 6E as the pulse 300; the "close" electric current pulse is generated later (after a time $t_y$) and is shown diagramatically as 301 in FIG. 6E. It must be noted that these electric pulses 300 and 301 represent the current drawn by the solenoid windings and not the voltage applied (the resistors $R_1$ and $R_2$ generate voltage drops $R_1 i_1$ and $R_2 i_2$, and $i_1$, $i_2$ indicate the currents through the respective solenoid windings); consequently, if one of the windings $S_1$ or $S_2$ is burned out or open circuited, no current will flow and no corresponding pulse will be produced (similarly, any other electrical failure will cause no current to flow through one or both of the resistors $R_1$, $R_2$).

The magnitude of the time $t_y$ of FIG. 6E and the length of the time $t_x$ has been explained and defined previously in this specification in connection with FIG. 5A.

The delay of the delay element 302 is equal to $t_y$. In other words, block 302 produces at its output a pulse, identical to the input pulse but delayed by the Time $t_y$. Such delay systems are well known and need no description here.

Since the delay of element 302 is equal to $t_y$, the pulse as shown by 303 will be in time coincidence with the pulse 301.

304 is an anti-coincidence circuit (also known as an OR gate) and produces at its output 305 an electric signal only when one of the pulses 301, 303 is impressed on it, but produces no output when both pulses 301 and 303 are present. 306 is a relay actuated by the signal on lead 305 and is arranged to disconnect the power to the downhole tool. Thus, if only a "close" pulse is present (without the "open" pulse) or if only an "open" pulse is present (without the "close" pulse), the power to the downhole power drive is disconnected then be closed mechanically by the "auto close" hydraulic system described in connection with FIG. 6D.

As an alternate arrangement in FIG. 6E, the relay 306 (which of course can be an electronic switch comprising transistors) can be arranged to interrupt the power only to the circuitry for the "opening" solenoid. This would have certain advantages because the "closing" circuitry will continue to function, and one of the objectives is to insure the "closing" of the valve. Furthermore, an electronic counter 314 may be interposed between the "OR" circuit and the relay circuit 306 so that a single electric malfunction will not disconnect the power. The power will then be disconnected only after, for example, 2, 4, or 8 successive malfunctions.

VII. Description of Automatic Cut-Off for Signalling Valve Power Drive

Figure 5C:
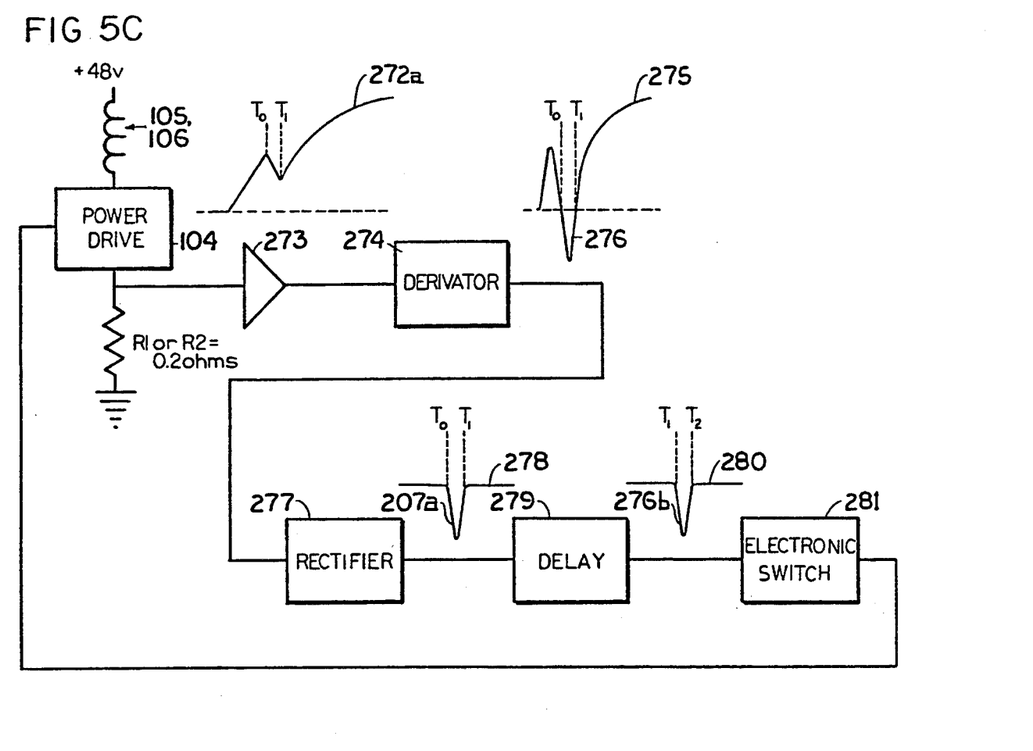
FIG. 5C shows schematically electronic circuitry which may be utilized to accomplish automatic cut-off of the power drive for the valve of the special telemetry tool.

As has been pointed out previously in this specification, very fast operation of the valve 40 of FIG. 4A is important. The requisite shock wave will not be produced if the valve operation is slow. Since the valve and its drive mechanism contain considerable mass, substantial power is necessary to open or close the valve in the time that is considered desirable. This power is of the order of $\frac{1}{2}$ to $\frac{3}{4}$ horsepower and can be provided by a power supply which has been described in section IV hereof. As in all designs of this nature, a margin of power is required in order to be sure that the valve always opens or closes upon command. The various electronic "logic circuits" and "power drive circuits" shown in FIG. 5A are designed to provide rectangular voltage pulses 104$b$ and 104$c$ that have a duration of about 40 to 50 milliseconds in order to make sure that the solenoid windings 105 and 106 are energized for a sufficient time to ensure the operation of the valve. FIG. 5E shows the voltage pulse 104$b$ of FIG. 5A in greater detail. At the time 0 the voltage is suddenly applied by the power drive 104 and rises almost instantaneously to the value shown by numeral 270, remains at this voltage value for 50 milliseconds, and then is cut off and falls (again almost instantaneously) to the value 0.

Figure 5D:
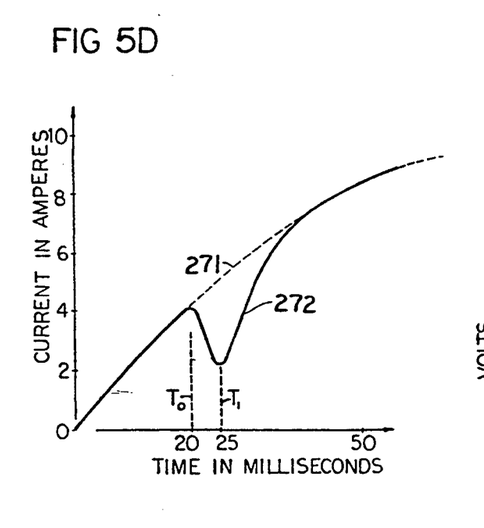
FIGS. 5D and 5E are graphs to aid in the explanation of the automatic cut-off for the signalling valve power drive.
Figure 5E:
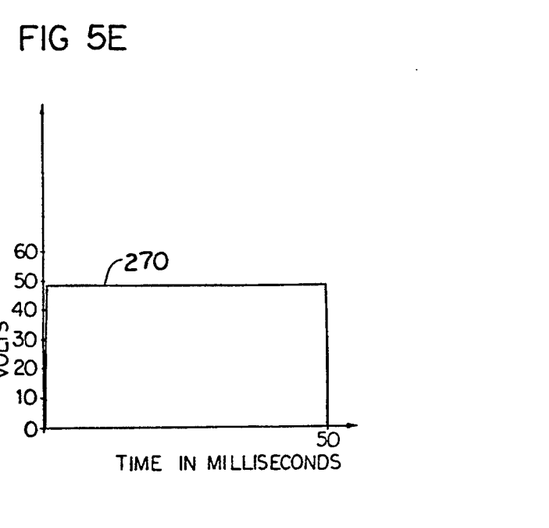

It is very informative to study the motion of the valve by making measurements of the current flow into the solenoid drive winding and constructing a graph (see FIG. 5D). From such a graph, the behaviour of the valve can be quantitatively studied. FIG. 5D shows such a graph in the form of an oscillogram of the current versus time. (This current is measured, for example by the voltage across resistor $R_1$ or $R_2$ of FIG. 6E.)

It is important to understand that it is the current through the solenoid winding that determines the force upon the valve stem 68 of FIG. 4A, since ampere turns determine the electromagnetic pull. Since the windings of the solenoid have inductance, the current will not build up instantaneously when a sudden voltage is applied as in FIG. 5E. If the solenoid comprised a simple inductor, then the current would build up according to simple exponential curve 271 of FIG. 5D as shown by the dotted curve. In actuality something quite different occurs: When the valve actuates (opens or closes) there is a sudden motion of the armature of the solenoid 79 of FIG. 4B and a back e.m.f. is generated. This back e.m.f. is caused by the velocity of the armature that quickly changes (increases) the inductance of the pertinent coil of the solenoid 79. In FIG. 5D, 271 shows the approximate current versus time curve in the solenoid winding when the armature of solenoid 79 and the valve stem 68 is "blocked" in the "open" or "closed" condition. The solid curve 272 in FIG. 5D shows the actual current buildup when the valve is not blocked; i.e., in actual working condition (opening or closing). The curves 272 for opening or closings are very similar. It is seen that curve 272, after the application of the voltage, gradually rises (since the respective solenoid coil 105, 106 has inductance) until it reaches, in the example shown, the value of 4 amperes at the time T. which is 20 milliseconds. Then there is the sudden drop of current that reaches the lower value of 2.2 amperes at the time $T_1$ which is 25 milliseconds. After the $T_1 = 25$ milliseconds, the current again increases according to the familiar "exponential" until it reaches, assymptotically, the value of about 10 amperes at the time of approximately 60 milliseconds (this value is determined by the resistance of the solenoid winding which in the example given is about 4.7 Ohms).

From a study of the curve 272 in FIG. 5D, it will become apparent that the valve 40 starts opening or closing at the time $T_0=20$ milliseconds and completes the motion at the time $T_1=25$ milliseconds. As was pointed out previously, an almost identical situation occurs during the "opening" or the "closing" of the valve; and the curve 272 would indicate that at the time $T_0=20$ milliseconds the valve starts its motion, and at the time $T_1=25$ milliseconds the motion is completed.

It is important to note that the time $T_1=25$ milliseconds on FIG. 5D is given as a typical example, and $T_1$ depends on a number of factors. Thus, at high differential pressures $T_1$ will be greater than 25 milliseconds and could be 30, 35 or 40 milliseconds. Suffice it to say that the time $T_1$ on FIG. 5D indicates the time when the valve actuation has been completed, and the current between the times $T_1$ and 50 milliseconds is in effect "wasted" since the acutation of the valve has already been completed. This extra time is a "safety factor" to ensure that, even under adverse conditions, the valve will always be actuated when the voltage pulse is applied.

In accordance with my invention I use the signal at the time $T_1$ to turn off any further current to the solenoid 79. Consequently all the current between the time $T_1$ and 50 milliseconds will be saved (thus reducing very substantially the total amount of energy required to operate the valve 40). It must be noted that the full "safety factor" referred to above is maintained; the current will continue to be applied until the valve has completed its (opening or closing) operation.

The electronic circuitry that is employed to accomplish the above objective is shown by FIG. 5C, wherein 104 indicates the power drive Of FIG. 4A. Between the power drive 104 and ground is interposed a resistor ($R_1$ or $R_2$) of low value (compared to the resistance of the solenoid) for example 0.2 ohms. The voltage across this resistor is, therefore, proportional to the current fed to the particular solenoid winding 104, 106. (Two circuits as shown in FIG. 5C are necessary—one for the opening solenoid power drive and a second for the closing solenoid power drive, but for simplicity of illustration, only one circuit is shown in FIG. 5C.) 273 is a conventional amplifier and at its output the voltage curve 272a of FIG. 5C will be a replica of the curve 272 in FIG. 5D. 274 is a derivator (well known in the electronics art) which generates an output voltage proportional to the first time derivative of its input voltage. Curve 275 shows this derivative voltage. It can be seen from observing curve 272 or 272a that the derivative (slope) of the curve is always positive except during the times between $T_0$ and $T_1$, during which time the slope (derivative) is negative. On the curve 275 only the impluse 276 is negative. 277 is a conventional receifier arranged to pass only the pulse 276, as shown on the graph 278. 279 is an electronic delay circuit (also well known in the art) which generates an output pulse 276b which is a replica of the input pulse but delayed by the time $T_1-T_0$. Thus, the pulse 276b as shown in graph 280 occurs slightly later than the time $T_1$. This pulse 276b is applied to an electronic switch 281 that is arranged to cut off the power to the power drive 104, thus stopping the current flow almost immediately after the valve 40 has completed its operation (opened or closed). The electronic switch 281 is arranged to restore the action of power drive 104 after an appropriate time. The process repeats itself when the next impulse 104a (or 104b) occurs.

It is important to note that the saving in energy that can be achieved by utilizing this aspect of my invention can be very substantial. Since very large powers are required to operate the valve 40 with the great speed required, this saving is very significant, and it could in the example shown increase the battery life by as much as 5 times.

VIII. Description of Sub and Housing Structure for Special Telemetry Tool

An important characteristic of the Measurement While Drilling (MWD) apparatus of this invention is its practicality; i.e., convenience and ease of adaptability to existing oil well drilling hardware and tools and drill strings. In the attempts of the prior art, large special steel housings 30 feet or more in length and 8 inches in diameter are required to house the complicated instrumentation; and their transportation from location to location requires specially constructed vehicles. In the apparatus of this invention, because there is no valving mechanism interposed in the main mud stream, it is possible to eliminate the heavy, very long, expensive special housing (approximately 30 feet long) and only a short section of drill collar. (called a "sub") is required. In the practical embodiment of this invention, this sub is only 36 inches long and 6¾ inches in diameter (instead of 30 feet which was previously required).

One of the important features of this invention, therefore, is that no heavy, long special housings are required. This is advantageous especially when downhole magnetic measurements such as compass indications (e.g., steering the drilling of a deviated hole) are to be made, which require use of non-magnetic drill collars. Non-magnetic drill collars are not only heavy (2–3 tons) but also extremely expensive ($20,000. each) since they must be manufactured of strictly nonmagnetic material such as K Monel. In the construction of the apparatus of this invention "Standard" API Drill Collars having outside diameters of 6" to 9" (which are the most common sizes) are utilized. All of the standard API collars have an inside diameter of 2 13/16"+1/16"−0". The simplicity, small size and coaxial construction of the valve system of this invention and its associated parts allow a special feature to be accomplished: All of the pertinent power drive and associated equipment can be located in a pressure resisting tube sufficiently small in diameter to permit it to be inserted into the inside bore (2 13/16") of a standard API Drill Collar without unduly interfering with mud flow. Some Sensors should be placed as near to the drill bit as possible. In particular, a downhole gamma ray Sensor should be capable of detecting the penetration of the bit into a given lithologic formation as soon as such penetration occurs. Furthermore, some sensors, such as a downhole compass-inclinometer require accurate indexing with respect to the "tool face" used in directional drilling. In addition, a compass-inclinometer must be placed at a substantial distance from any magnetic or paramagnetic material. Furthermore, when a compass-inclinometer is employed, the housings 250a and 250b in FIG. 7A must be carefully indexed angularly with respect to the sub 253, which in turn is indexed with respect to the "Bent Sub" used in directional drilling.

The "bent sub" is equipped with an indexing mark 253a and the angle of this indexing mark must have a constant and measured angular relationship to the indexing mark 254a that is placed on the telemetering sub 254. This known angle (representing the angle between indexing marks 253a and 254a is then introduced into the computation for the determination of the bearing and angle with respect to a vertical plane of the "Bent Sub".

FIG. 7A is a schematic showing of the special telemetry tool 50, illustrating the arrangement wherein the "special long tool" is eliminated and only a short section of drill collar sub is required, as was previously mentioned. In FIG. 7A, a housing designated by numeral 250 is made up of an upper section 250a and a lower section 250b, as was previously described with reference to FIG. 4A. The upper section 250a is contained within a short sub 254 (only about 36 inches long). This short sub is especially bored out to provide an inside diameter (e.g. 4½") sufficient to house the valve assembly 40 and also to permit the unrestricted flow of drilling mud past upper section 250a through passages 61, which are also designated by numeral 61 in FIG. 4A. The housing 250a is of small diameter, preferably, 2 11/16" OD or less. A drill Collar 255 provided by the user (the oil company or the drilling contractor) is usually 30 feet long and of great weight and cost. The inside diameter of a standard API Drill Collar as was pointed out previously is 2 13/16"−0+1/16". Centralizer members 256 are provided for lower housing 250b. These are slightly smaller in diameter than the ID of the standard API Drill Collar, for example, 2¾" O.D. Small clearance is very important in order to prevent "chatter" when the tool is vibrated during drilling. Discharge passage 85 is the same as that shown in FIG. 4A. The housing 250b is suspended within the sub 254 by securing means not shown. The cross-section shape of the centralizers 256, as indicated in FIG. 7B, is such as to provide slots or passages 258 to permit free flow of drilling mud.

The housing lower section 250b is actually made up of several sub-sections which are connected, one to another, by a special connector means shown in FIG. 7C. As shown in FIG. 7C, each sub-section is provided at its upper end slot 260 and at its lower end a protrusion or tooth 261. A protusion 261 of one sub-section matingly engages a slot 260 of the adjacent sub-section. The adjacent sub-sections are retained by a connector sleeve 262 which is matingly received by the end portions of the sub-sections. Circular openings 263 in the sub-sections are aligned with respective threaded openings 264 in the connector sleeve 262, and the parts are secured by screws 265. The special connector means of FIG. 7C provides for accurate angular indexing when sub 253 is a "Bent Sub".

As was pointed out previously, the angle between indexing marks 253a and 254a must be known in order to compute the angle with respect to vertical of the "Bent Sub". It is also necessary that the angular displacement between the axes of a magnetometer-inclinometer and the mark 254a be known and invariable during the drilling operation (it is preferred but not necessary that the angle between one of the horizontal axes of the magnetometer-inclinometer and the indexing mark 254a be zero). For this purpose the tool 250b is assembled with angular indexing teeth 261 as shown on FIG. 7C and FIG. 7A.

In order to design an efficient telemetering system two requirements will be considered. One of these deals with optimum conditions for obtaining the regime of hydraulic shock waves. The other requirement is concerned with obtaining shock waves of sufficient intensity to override extraneous noise effects.

The concept of using two transmission channels connected in cascade, the first channel for a relatively short distance within the borehole and the second channel for the principal distance between the subsurface and the surface is described in Scherbatskoy, U.S. Pat. No. 4,057,781, which is incorporated into this patent and application by reference.

What is claimed is:

1. A logging while drilling assembly for use in a borehole and a drilling string and mud in a circulation system comprising:
   a) a first signal generator means comprising apparatus for generating a signal representative of a sensed downhole condition and mounted downhole near the drill bit of said drilling string;
   b) a second signal generator means comprising a pulser for generating pressure pulses in said mud and mounted uphole from said first signal generator means, said pulser comprising a valve located between an inside of said drilling string and an outside of said drilling string, said pulser further comprising means for generating said pressure pulses in said mud by opening and closing said valve;
   e) a first transmission system having its downhole end connected to said first signal generator means and its uphole end connected to said pulser;
   d) a second transmission system having its downhole end connected to said pulser and its uphole end connected to a pressure transducer at the surface of the earth;
   e) a receiver of said pressure pulses at the surface for producing an indication of said sensed downhole condition.

* * * * *